United States Patent
Fistler et al.

(10) Patent No.: US 12,172,245 B2
(45) Date of Patent: Dec. 24, 2024

(54) EXTRUDED WELD JOINT BACKING INSERT

(71) Applicant: FCA US LLC, Auburn Hills, MI (US)

(72) Inventors: Mark R Fistler, Armada, MI (US); Justin G Hunt, Leonard, MI (US)

(73) Assignee: FCA US LLC, Auburn Hills, MI (US)

( * ) Notice: Subject to any disclaimer, the term of this patent is extended or adjusted under 35 U.S.C. 154(b) by 102 days.

(21) Appl. No.: 17/992,286

(22) Filed: Nov. 22, 2022

(65) Prior Publication Data

US 2024/0165728 A1    May 23, 2024

(51) Int. Cl.
*B23K 9/00* (2006.01)
*B23K 9/035* (2006.01)
*B23K 101/00* (2006.01)

(52) U.S. Cl.
CPC ........ *B23K 9/035* (2013.01); *B23K 2101/006* (2018.08)

(58) Field of Classification Search
CPC .............. B23K 9/035; B23K 2101/006; B23K 37/053–0531; B23K 37/04–0452
USPC .......................................... 228/49.1–49.4, 50
See application file for complete search history.

(56) References Cited

U.S. PATENT DOCUMENTS

| | | | | |
|---|---|---|---|---|
| 1,344,221 A * | 6/1920 | Burns | ................ | E21B 17/04 219/137 R |
| 2,156,395 A * | 5/1939 | Klouman | ................ | F27D 3/026 285/19 |
| 2,558,246 A * | 6/1951 | Gray | ................ | H01M 50/172 285/200 |
| 2,796,843 A * | 6/1957 | Kleppinger | ................ | B23K 9/0358 219/160 |
| 2,952,484 A * | 9/1960 | Zoltok | ................ | E04H 12/08 403/297 |
| 2,977,916 A * | 4/1961 | Hawkins | ................ | B23K 37/0531 29/272 |
| 3,031,995 A * | 5/1962 | Taylor, Jr. | ................ | B23K 37/0531 269/48.1 |
| 3,247,591 A * | 4/1966 | Panseri | ................ | G21C 3/10 376/261 |
| 3,432,916 A * | 3/1969 | Reichert | ................ | B21D 39/206 29/523 |
| 3,494,642 A * | 2/1970 | Brown | ................ | F16B 7/02 403/345 |

(Continued)

FOREIGN PATENT DOCUMENTS

| | | | |
|---|---|---|---|
| CN | 1190176 C | * | 2/2005 |
| CN | 104588941 A | * | 5/2015 |

(Continued)

*Primary Examiner* — Kiley S Stoner
(74) *Attorney, Agent, or Firm* — Jeremy J. Klobucar

(57) ABSTRACT

A welding backing insert (20) includes a body (22), a retention member (24) and an insertion member (26). The retention member (24) includes at least one leg (28) being deflectable to enable insertion into a hollow profile structural extrusions (14). At least one leg (28) tries to return to its original position exerting a force on the hollow profile structural extrusion (14) to retain the backing insert (20) in the hollow profile structural extrusion (14). The insertion member (26) projects from the body for inserting into a second hollow profile structural extrusion (14). A gap-control joint spacer (50) projects from the body to provide a gap between adjacent hollow profile structural extrusions.

14 Claims, 6 Drawing Sheets

(56) References Cited

U.S. PATENT DOCUMENTS

| | | | | |
|---|---|---|---|---|
| 3,645,569 | A | * | 2/1972 | Reilly ................... F16B 7/0446 403/217 |
| 4,162,566 | A | * | 7/1979 | Webb ...................... F25B 41/40 29/890.035 |
| 4,219,221 | A | * | 8/1980 | Webb ...................... F16L 25/00 403/283 |
| 4,418,860 | A | * | 12/1983 | LaForce ............. B23K 37/0531 228/44.5 |
| 4,505,420 | A | * | 3/1985 | Wittenbach .......... B23K 37/053 219/137 R |
| 4,579,273 | A | * | 4/1986 | Dahmen ................. F16L 13/02 228/49.3 |
| 5,018,899 | A | * | 5/1991 | Kuribara .................. B62D 1/16 464/134 |
| 5,173,000 | A | * | 12/1992 | Nolan .................... A01K 61/60 403/228 |
| 5,704,728 | A | * | 1/1998 | Chan ..................... F21V 21/116 403/292 |
| 7,909,226 | B2 | * | 3/2011 | Bruggenbrock .... B21C 37/0815 219/160 |
| 8,550,326 | B2 | * | 10/2013 | Packer ................ B23K 20/126 269/48.3 |
| 9,116,025 | B2 | * | 8/2015 | Seo ........................ G01D 21/00 |
| 9,862,062 | B1 | * | 1/2018 | Palmer ............... B23K 37/0435 |
| 10,472,016 | B2 | * | 11/2019 | Choi ........................ B62K 19/20 |
| 2002/0102127 | A1 | * | 8/2002 | Loh ........................ E06B 3/667 403/292 |
| 2005/0074278 | A1 | * | 4/2005 | Tani ........................ F16B 7/182 403/300 |
| 2007/0189850 | A1 | * | 8/2007 | Minowa ................... F16B 7/22 403/370 |

FOREIGN PATENT DOCUMENTS

| | | | | | |
|---|---|---|---|---|---|
| CN | 104889668 | A | * | 9/2015 | |
| CN | 104942521 | A | * | 9/2015 | |
| CN | 104942521 | B | * | 7/2017 | |
| CN | 107303633 | A | * | 10/2017 | |
| CN | 107350710 | A | * | 11/2017 | ......... B23K 37/0531 |
| CN | 107838626 | A | * | 3/2018 | ......... B23K 37/0531 |
| CN | 207436279 | U | * | 6/2018 | ........... E04B 1/2403 |
| CN | 207538225 | U | * | 6/2018 | ........... E04B 1/2403 |
| CN | 109434366 | A | * | 3/2019 | ........... B23K 31/027 |
| CN | 109530444 | A | * | 3/2019 | |
| CN | 209993772 | U | * | 1/2020 | |
| CN | 116100184 | A | * | 5/2023 | |
| GB | 2098118 | A | * | 11/1982 | ......... B23K 37/0531 |
| JP | 2007-245202 | A | | 9/2007 | |
| JP | 2012-117300 | A | | 6/2012 | |
| JP | 2019-218710 | A | | 12/2019 | |
| KR | 20130001604 | U | * | 3/2013 | |
| KR | 20140040339 | A | * | 4/2014 | |
| KR | 20150142752 | A | * | 12/2015 | |
| KR | 101751299 | B1 | * | 6/2017 | |
| KR | 20170106741 | A | * | 9/2017 | |
| WO | WO-2005040620 | A1 | * | 5/2005 | .............. F16B 7/025 |

* cited by examiner

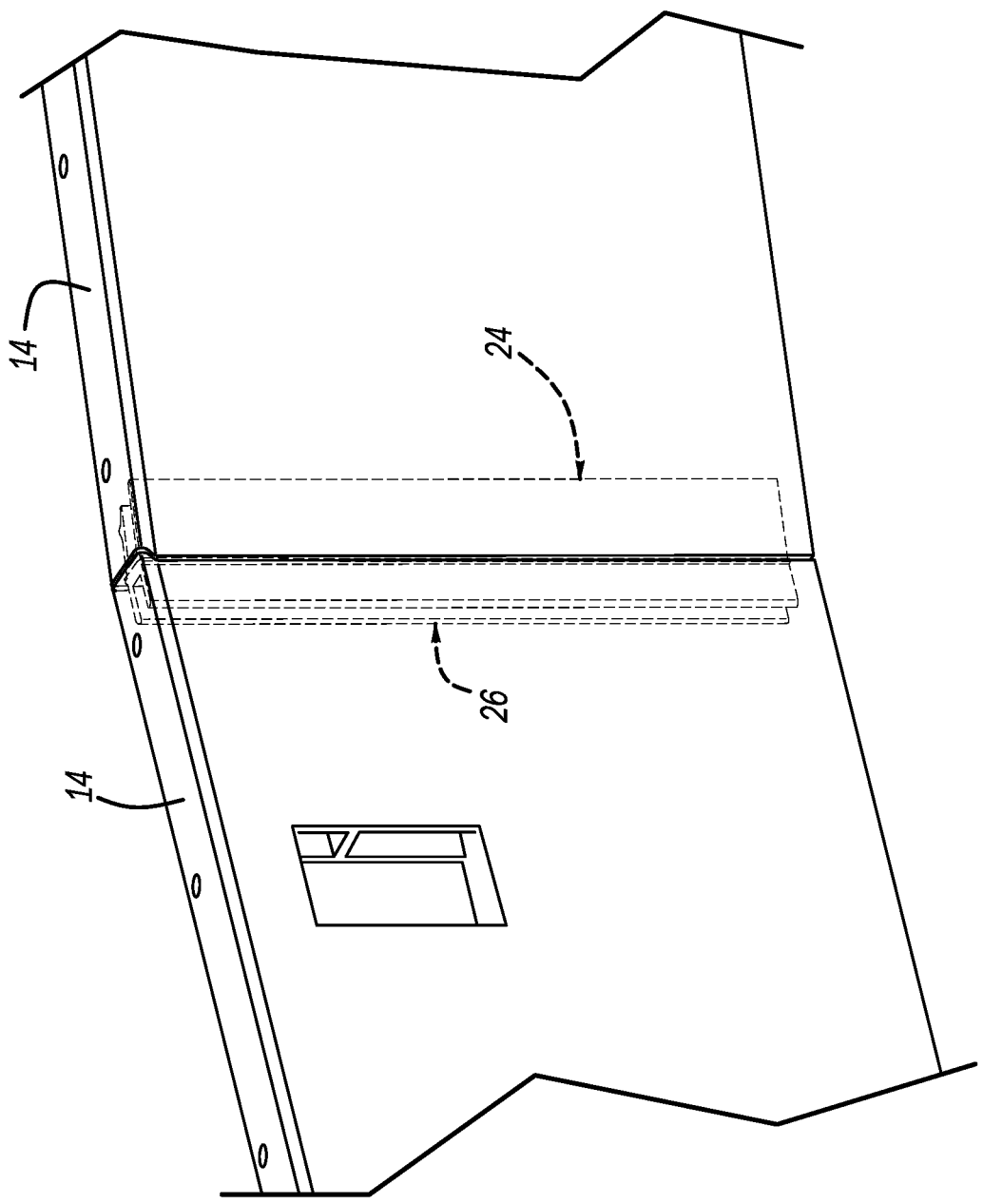

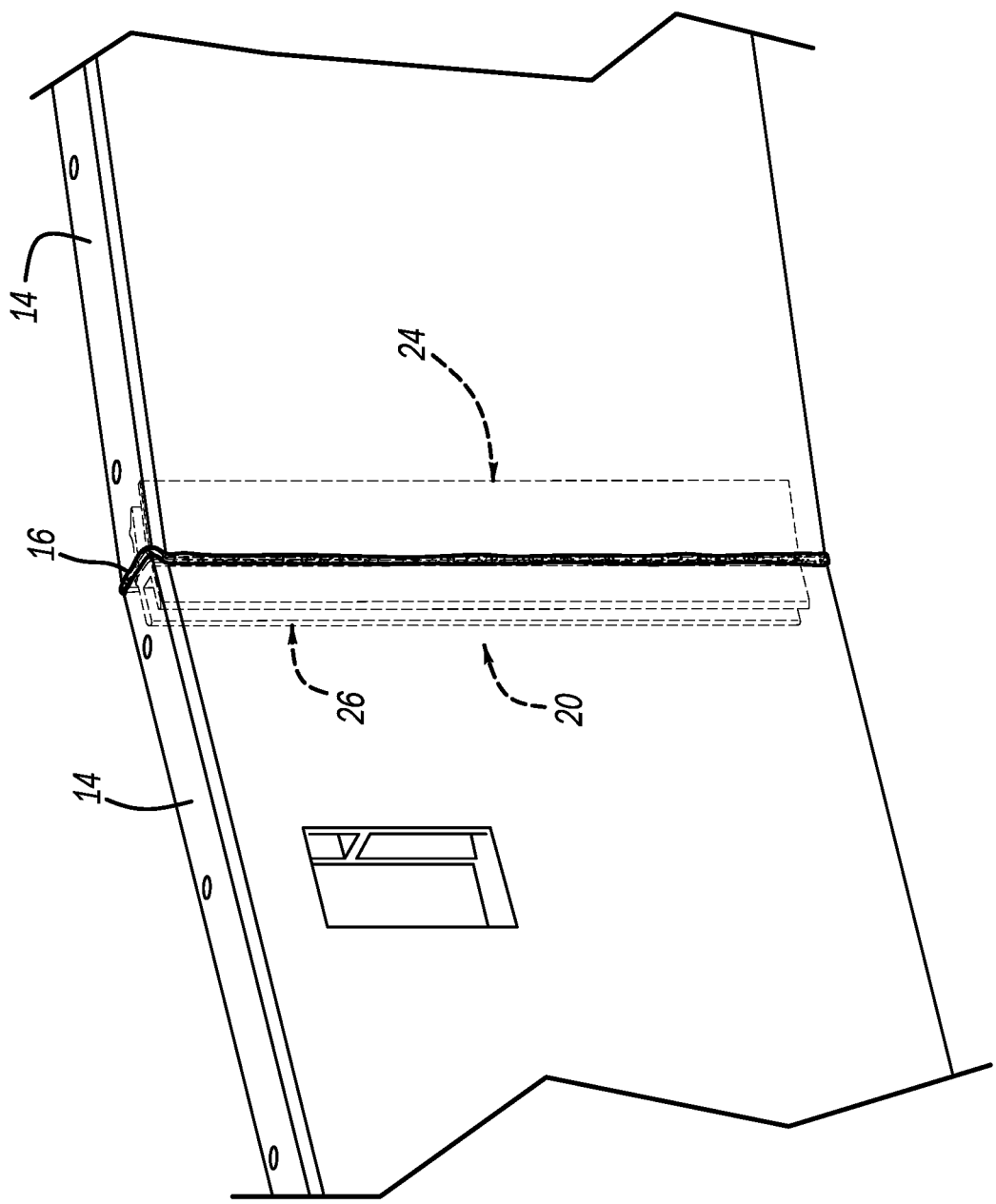

EXTRUDED WELD JOINT BACKING INSERT

FIELD

The present disclosure relates to automotive battery case assemblies and, more particularly, to an extruded weld joint backing insert to enable welding of adjoining hollow profile structural extrusions of the assemblies.

BACKGROUND

This section provides background information related to the present disclosure which is not necessarily prior art.

Gas metal arc welding of opened root butt joints is not generally recommended in automotive arc welding design standards. Welding robustness for this type of joint is generally poor. The occurrence of insufficient penetration or burn-through is common during welding and may result in leakage, part failure, or excessive re-work.

Due to design constraints and the need to use extruded profiles in automotive battery case assemblies, open root butt joints cannot be avoided in many applications. Accordingly, it would be desirable to utilize a butt weld joint with backing that mitigates the current manufacturing deficiencies.

According to the disclosure, an extruded weld joint backing insert provides internal backing for all sides of the structural aluminum extrusions that are welded in the butt joint configuration. The extruded weld joint backing insert solves the insufficient penetration and burn through problems by providing a backing behind the butt joint on all sides of the extrusion to enable full penetration welds without burn through. The inserts are generally manufactured from the same alloy as the structural aluminum extrusion components that are being welded together, such as the external frame of the battery cases. The profile of the extruded weld joint backing insert matches the weld joint of the structural members to be welded. The extruded weld joint backing insert includes retention tabs that provide a push fit to retain the extruded weld joint backing insert onto at least one of the hollow profile structural extrusion members.

SUMMARY

This section provides a general summary of the disclosure and is not a comprehensive disclosure of its full scope or all of its features.

According to an aspect of the present disclosure, a welding backing insert comprises a body with a retention member projecting from the body. The retention member includes at least one leg that is deflectable to enable insertion into a hollow profile structural extrusion. Once the insert is inside the hollow profile structural extrusion, at least one leg attempts to return to its original position exerting a force onto the inside of the hollow profile structural extrusion to retain the backing insert onto the extrusion profile. Optionally, a gap-control joint spacer may be designed into the backing insert which projects from the body to provide a gap between adjacent hollow profile structural extrusions to enable a butt weld to connect the two structural tubes together and fuse the backing insert into position to prevent rattle. The retention member and insertion member have an overall U-shape in cross section. The complete weld backing insert has an overall H-shape in cross-section. The retention member may include two deflectable legs. The gap-control joint spacer projects a desired distance from the body to enable the butt weld to be positioned between the two structural tubes. Additionally, both the retention and insertion members each include a pair of legs.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 4A-4C are perspective views of assembling the insert with hollow profile structural extrusions.

Corresponding reference numerals indicate corresponding parts throughout the several views of the drawings.

DETAILED DESCRIPTION

Example embodiments will now be described more fully with reference to the accompanying drawings.

Figure 1:
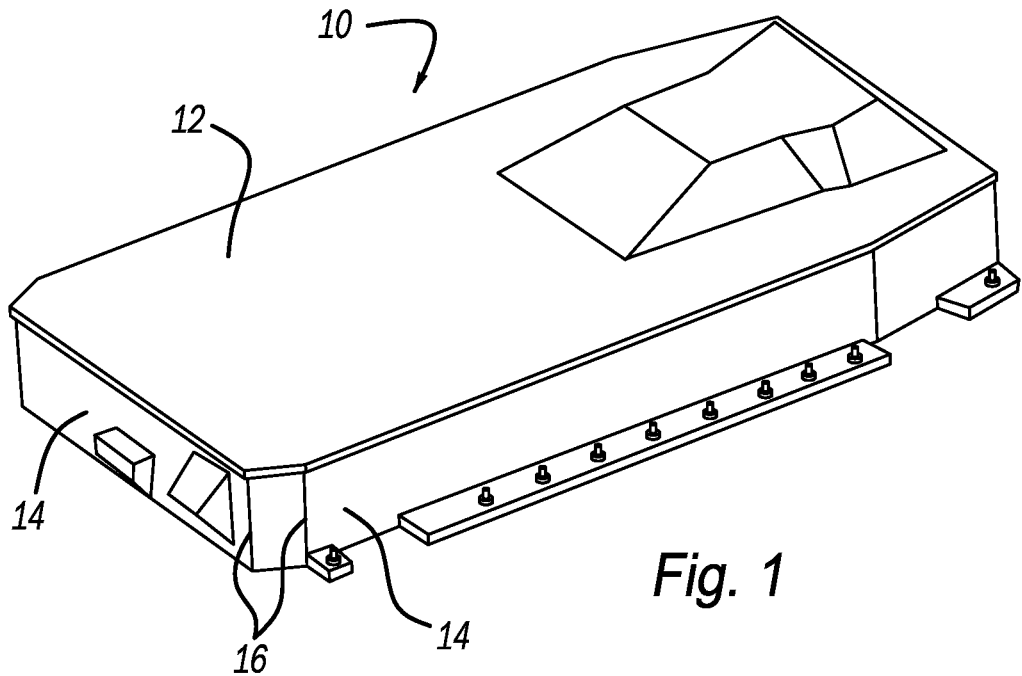
FIG. 1 is a perspective view of a battery case assembly.
Figure 2:
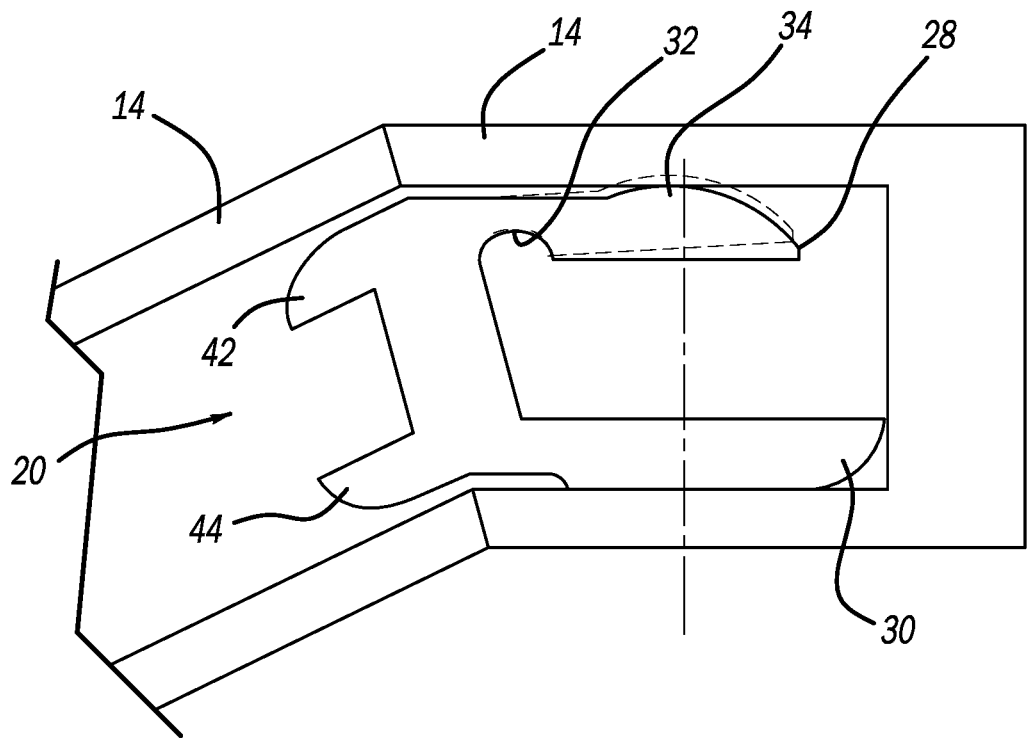
FIG. 2 is a cross-section view along line 2-2 of FIG. 1 without a gap-control joint spacer.
Figure 3:
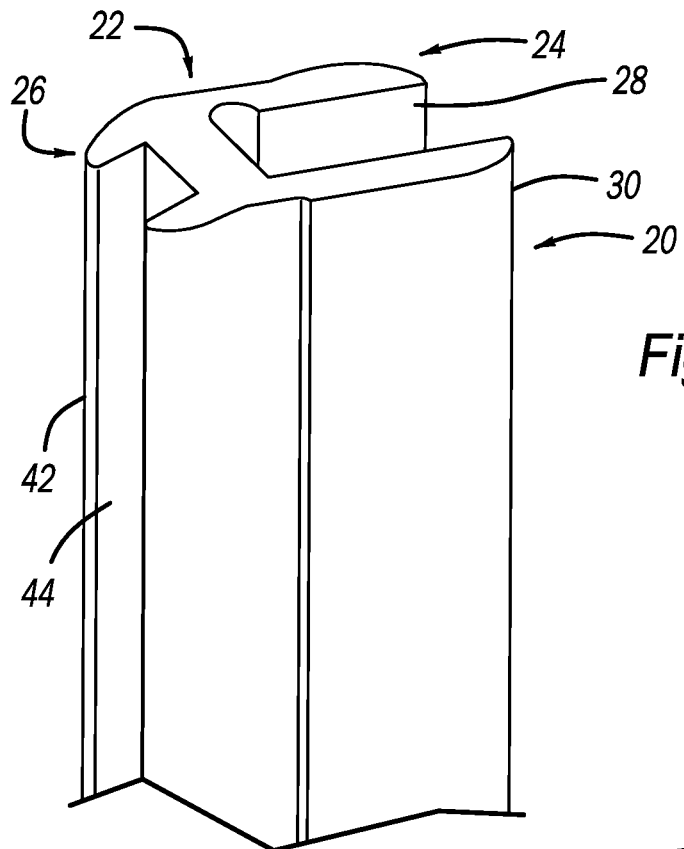
FIG. 3 is a perspective view of an insert without a gap-control joint spacer.

Turning to FIG. 1, a battery case assembly is illustrated and designated with the reference number 10. The assembly 10 includes a top 12 and sides 14. The sides 14 are hollow profile structural extrusion members and are connected with one another via a butt weld 16. An insert 20 is positioned in the hollow profile structural extrusions 14 between adjoining pieces. This is illustrated in FIG. 2. A bottom cover, not illustrated, is also included.

The insert provides an internal backing around the entire periphery of the weld joint on all sides of the hollow profile structural extrusions 14 that are welded via the butt welds 16. The insert 20 is made from the same alloy as the hollow profile structural extrusions 14. The profile of the insert 20 matches the weld joint of the hollow profile structural extrusion members 14.

The insert 20 includes a body 22, a retention member 24, and an insertion member 26. The retention member 24 and the insert member 26 have an overall U-shape in cross section to provide the insert with an overall H-shape.

The retention member 24 includes a first leg 28 and a second leg 30. The body 22 acts as a web to connect the legs 28, 30 with one another. The first leg 28 includes an inner cutout 32 that provides the leg with a deflectable characteristic. Thus, the leg 28 is deflectable with respect to the body 22. When the insert is positioned inside of the hollow profile structural extrusion members 14, the leg 28 is deflected so that it can enter into the hollow profile structural extrusion 14. The leg 28 includes a hump 34 to enable the leg 28 to apply a force onto the internal surface of the hollow profile structural extrusion 14 so that as the leg 28 attempts to return to its original position, the hump 34 applies a force against the internal wall to hold the insert inside of the hollow profile structural extrusion as illustrated in FIG. 2. The leg 30 is generally longer than the leg 28 and provides a surface to abut the internal surface of the hollow profile structural extrusion 14.

After the insert 20 is positioned into the hollow profile structural extrusion 14, the second hollow profile structural extrusion is positioned on the insertion member 26.

The insertion member 26 includes a pair of legs 42, 44. The legs 42, 44 are substantially identical and project into the second tube to be positioned inside of the hollow profile structural extrusion 14 to provide the internal backing for all sides of the hollow profile structural extrusion 14.

Figure 4A:
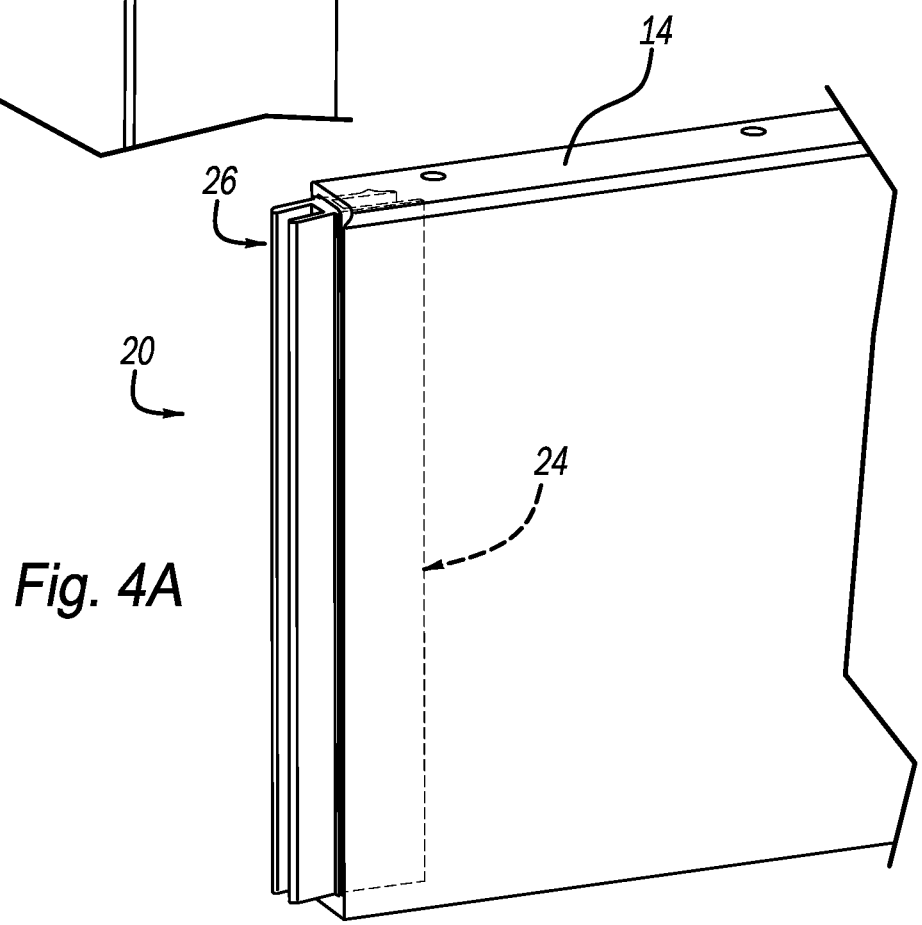

As seen in FIGS. 4A-4C, the insert 20 is positioned into the first hollow profile structural extrusion. The deflecting leg 28 secures the insert within the hollow profile structural extrusion 14. The second hollow profile structural extrusion 14 is positioned onto the insertion member 26. Next, the butt weld 16 is applied around the periphery of the hollow structural extrusions 14 to secure the hollow profile structural extrusion 14 with one another and to provide a butt weld with complete penetration, while eliminating burn through and excessive rework.

Figure 5:
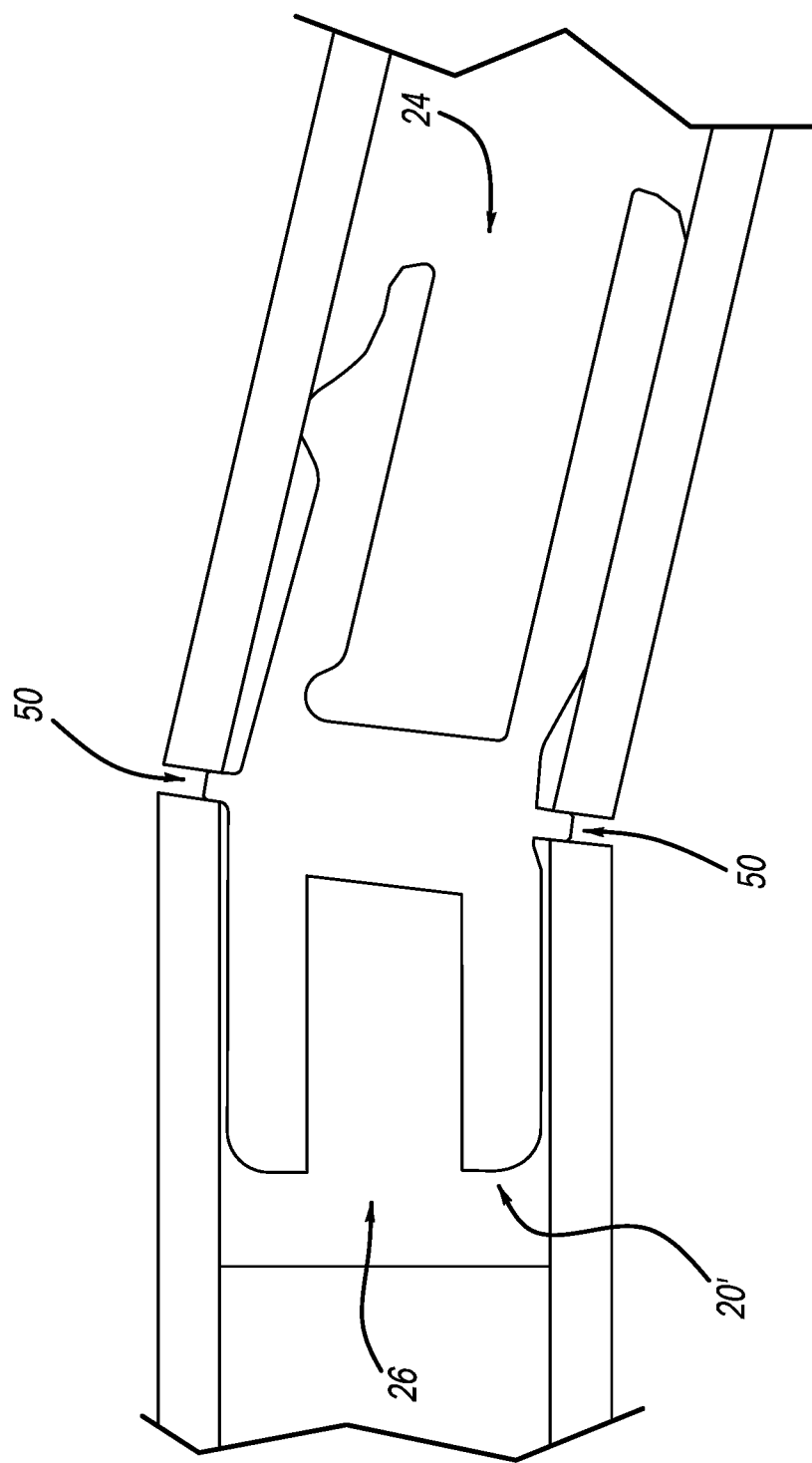
FIG. 5 is a cross-section view like FIG. 2 of a second embodiment with a gap-control joint spacer.

FIG. 5 is a second embodiment of the disclosure. FIG. 5 illustrates an insert 20' and includes the body 22, retention member 24, and insertion member 26 as previously described. Thus, the detailed description of these elements will be understood.

A spacer 50 extends from the body 22. The gap-control joint spacer 50 is on both sides of the body as illustrated in FIG. 5. Also, the gap-control joint spacer 50 could be positioned on the top and bottom of the insert if desired. The gap-control joint spacer 50 has a desired width and height. The width of the gap-control joint spacer 50 defines the gap between the two hollow profile structural extrusions. Thus, the gap is designed when required for a butt weld 16 and is dependent on tubular extrusion wall thickness. The gap-control joint spacer 50 also projects a desired length or height from the body. The length or height is such that the depth of the butt weld can be at an optimum to provide securement of the two hollow profile structural extrusions 14 with one another.

Figure 6:
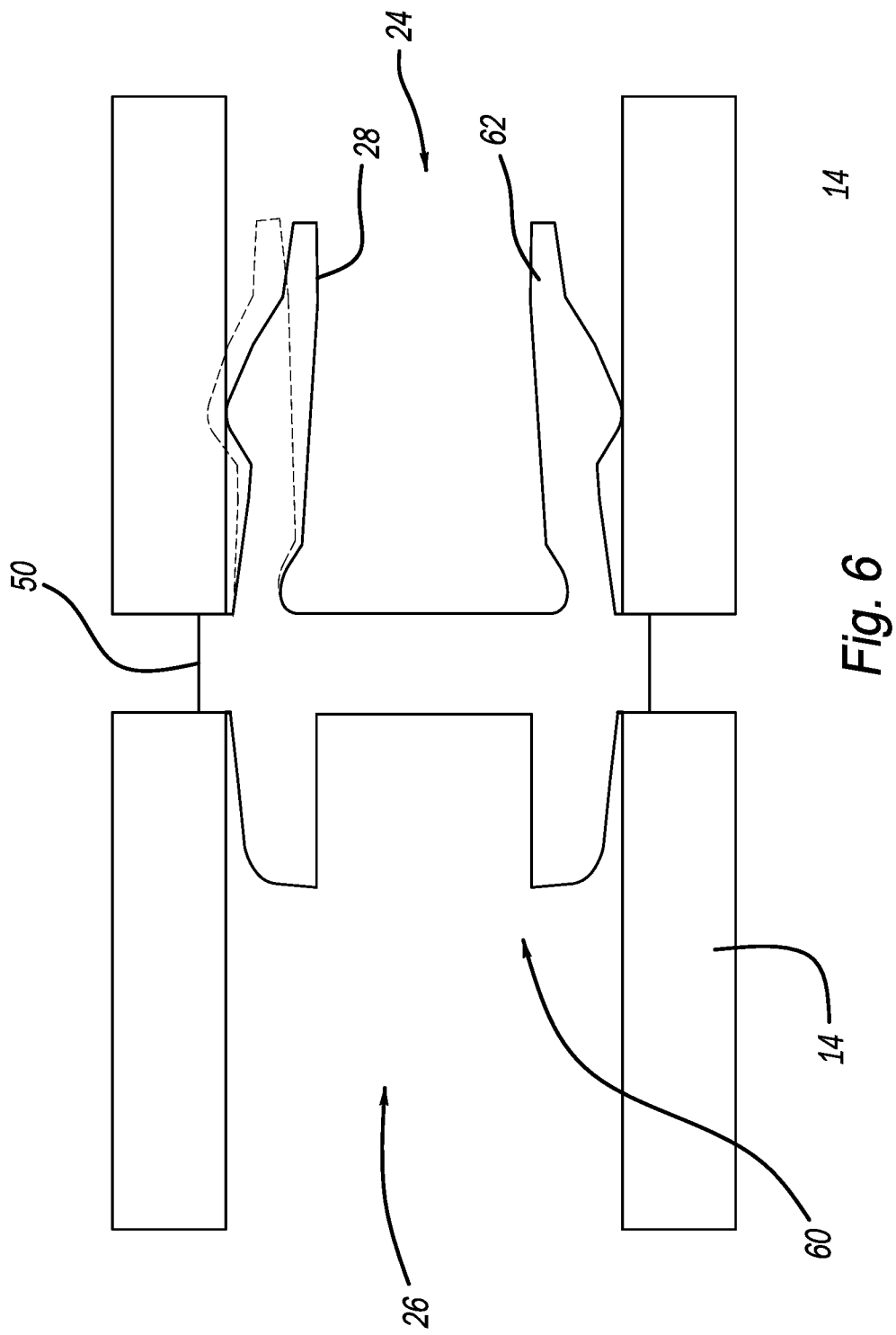
FIG. 6 is a cross-section view like FIG. 5 of a third embodiment with a gap-control joint spacer and double retention tabs.

Turning to FIG. 6, an additional embodiment is illustrated. The embodiment of FIG. 6 is like that of FIG. 5. Thus, the same reference numerals will designate the same elements. The difference of insert 60 is that the first retention member 26 includes a pair of deflectable legs. Thus, the leg 62 is substantially identical to the leg 28 and deflects to be positioned within the structural tube 14 and then exerts a force like that of leg 28.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A welding backing insert comprising:
a body; and
a retention member projecting from the body, the retention member includes at least one leg being deflectable to enable insertion into a hollow profile structural extrusion so that once inside the hollow profile structural extrusion the at least one leg tries to return to its original position exerting a force on the hollow profile structural extrusion to retain the backing insert in the hollow profile structural extrusion;
an insertion member projecting from the body for inserting into a second hollow profile structural extrusion, the weld backing insert has an overall H-shape in cross section.

2. The welding backing insert of claim 1, further comprising a gap-control joint spacer projecting a desired distance from the body, the spacer providing a gap between adjacent hollow profile structural extrusions.

3. The welding backing insert of claim 1, wherein the retention member is U-shaped in cross section.

4. The welding backing insert of claim 3, wherein both legs are deflectable.

5. The welding backing insert of claim 2, wherein the spacer projects a desired distance from the body to enable a butt weld between the two hollow profile structural extrusions.

6. The welding backing insert of claim 1, wherein the retention member includes a pair of legs.

7. A weld connection with an insert comprising:
a pair of hollow profile structural extrusions;
an insert positioned between and in the hollow profile structural extrusions, the insert comprising:
a body;
a retention member projecting from the body, the retention member includes at least one leg being deflectable to enable insertion into one of the hollow profile structural extrusions so that once inside the hollow profile structural extrusions the at least one leg tries to return to its original position exerting a force on the hollow profile structural extrusions to retain the backing insert in the hollow profile structural extrusions; and
a gap-control joint spacer projecting from the body, the spacer providing a gap between adjacent hollow profile structural extrusions;
the retention member positioned in one of the hollow profile structural extrusions; and
a butt weld welding the hollow profile structural extrusions to one another.

8. The welding connection of claim 7, further including an insertion member projecting from the body for inserting into the other hollow profile structural extrusions.

9. The welding connection of claim 7, wherein the retention member is U-shaped in cross section.

10. The welding connection of claim 7, wherein both legs are deflectable.

11. The welding connection of claim 7, wherein the spacer projects a desired distance from the body to enable a butt weld between the two hollow profile structural extrusions.

12. The welding connection of claim 8, wherein the weld backing insert has an overall H-shape in cross section.

13. The welding connection of claim 7, wherein the retention member includes a pair of legs.

14. A welding backing insert comprising:
a body; and
a retention member projecting from the body, the retention member includes at least one leg being deflectable to enable insertion into a hollow profile structural extrusion so that once inside the hollow profile structural extrusion the at least one leg tries to return to its original position exerting a force on the hollow profile structural extrusion to retain the backing insert in the hollow profile structural extrusion;

a gap-control joint spacer projecting a desired distance from the body, the spacer providing a gap between adjacent hollow profile structural extrusions enabling a butt weld between the two hollow profile structural extrusions.

\* \* \* \* \*